United States Patent [19]

Larkin

[11] Patent Number: 5,542,336
[45] Date of Patent: Aug. 6, 1996

[54] POSITIONING APPARATUS AND METHOD UTILIZING PWM CONTROL OF A DOUBLE-ACTING HYDRAULIC CYLINDER

[75] Inventor: Robert F. Larkin, Pittsfield, Mass.

[73] Assignee: Martin Marietta Corporation, King of Prussia, Pa.

[21] Appl. No.: 423,069

[22] Filed: Apr. 17, 1995

[51] Int. Cl.$^6$ .............................. F01B 1/00; F15B 15/17
[52] U.S. Cl. ................ 91/166; 91/415; 91/459; 91/462
[58] Field of Search .................. 91/165, 166, 415, 91/459, 463, 464, 465, DIG. 2

[56] References Cited

U.S. PATENT DOCUMENTS

| | | | |
|---|---|---|---|
| 3,479,924 | 11/1969 | Ferguson | 91/165 |
| 4,450,753 | 5/1984 | Basrai et al. | 91/465 X |
| 4,813,339 | 3/1989 | Uno et al. | 91/459 |
| 4,932,311 | 6/1990 | Mibu et al. | 91/459 X |
| 4,951,468 | 8/1990 | Sasajima | 91/459 X |
| 5,284,083 | 2/1994 | Vaslin | 91/459 X |

FOREIGN PATENT DOCUMENTS

| | | | |
|---|---|---|---|
| 0192603 | 11/1982 | Japan | 91/465 |
| 2113310 | 8/1983 | United Kingdom | 91/459 |

*Primary Examiner*—Hoang Nguyen
*Attorney, Agent, or Firm*—Robert A. Cahill; Geoffrey H. Krauss

[57] ABSTRACT

A double-acting hydraulic cylinder is controlled by a pair of three-way solenoid valves respectively fluid connected to the two ends of the cylinder and energized in parallel with a continuous stream of pulse width modulated (PWM) pulses to create a mean effective fluid pressure balance at the cylinder ends that hold a desired position of a connected load and mean effective fluid pressure imbalances in the cylinder ends that produce variable rate load movement in either of two directions to a desired new position, all determined by the pulse duty cycle.

9 Claims, 1 Drawing Sheet

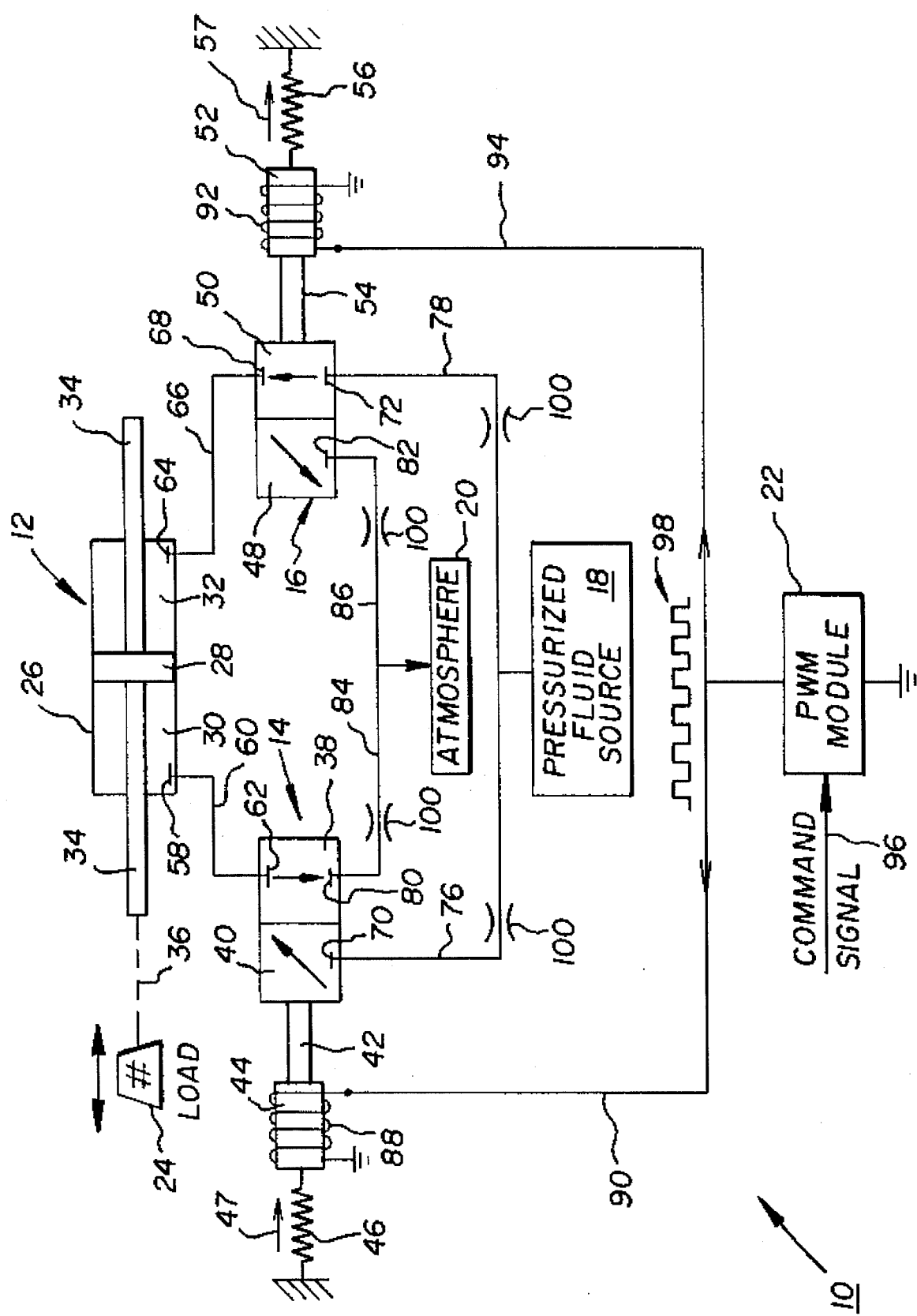

POSITIONING APPARATUS AND METHOD UTILIZING PWM CONTROL OF A DOUBLE-ACTING HYDRAULIC CYLINDER

FIELD OF THE INVENTION

The present invention relates generally to positioning apparatus and particularly to apparatus for selectively positioning and bidirectionally repositioning a load.

BACKGROUND OF THE INVENTION

Innumerable situations arise in equipment design that require controlled positioning and repositioning of a member (load). Numerous factors are involved in the selection of the type of actuator that is utilized to produce the positioning movements of the member, such as the nature of the equipment, the magnitudes of the forces required to both translate the member from position to position and to hold the member in a desired position, and the available power sources for the actuator. When fluid power, typically pressurized hydraulic fluid or compressed air, is available, a hydraulic (pneumatic) cylinder is the actuator of choice.

A conventional fluid cylinder includes a piston that is slidingly received in the cylinder to divide the cylinder into a pair of chambers, one to each side of the piston. The piston is typically mechanically linked to the member. If the fluid cylinder is of the single-acting type, pressurized fluid is selectively introduced into only one of the chambers by a fluid valve, while the other chamber is vented to a lower pressure (typically atmosphere), either continuously or selectively through the fluid valve. The piston is then propelled in the direction of the vented chamber, and the member linked thereto is driven in a desired direction from a quiescent position to an actuated position. Typically, the member is restored to its quiescent position by a return spring while both chambers are vented.

When bidirectional positioning of the member is desired, a double-acting fluid cylinder is utilized as the actuator. Here, typically separate three-way fluid valves are controlled to either vent the chambers or connect the chambers to the pressurized fluid source. When both chambers are connected to the pressurized fluid source, the fluid pressures in the chambers are balanced and the position of the piston is fixed to forcibly hold the member at a desired position. To move the member in either of two directions to a desired new position, the appropriate one of the chambers is vented until the member is driven to the new position and then is reconnected to the pressurized fluid source.

A particularly suitable fluid valve for controlling a fluid cylinder utilized as a positioning actuator is a three-way solenoid valve. The capability of electrically actuating a fluid valve to its several valve positions lends versatility and precision to controlling both positioning and repositioning of a member. Moreover, electrical control of fluid valve positions is readily conducive to microprocessor implementation.

SUMMARY OF THE INVENTION

A principal objective of the present invention is to provide an improved apparatus and method for controllably positioning and bidirectionally repositioning a load.

A further objective of the present invention is to provide an improved positioning apparatus and method of the above character, that utilizes a double acting fluid cylinder as the positioning actuator.

An additional objective of the present invention is to provide the improved positioning apparatus and method of the above character that affords electronic control of the positioning actuator.

To achieve these and other objectives, the positioning apparatus of the present invention comprises a fluid actuator including a cylinder and a piston disposed in the cylinder to define first and second chambers, a first fluid valve having a quiescent valve position connecting the first chamber to a source of fluid pressure and an actuated position venting the first chamber, and a second fluid valve having a quiescent valve position venting the second chamber and an actuated valve position connecting the second chamber to the fluid pressure source. A module, operatively connected to the first and second fluid valves, responds to input commands by periodically and simultaneously activating the first and second fluid valves to their respective actuated positions, thereby creating differential fluid pressures in the first and second chambers to produce relative motion of the piston and the actuator. This relative motion is coupled to produce positioning movements of a load.

The objectives of the present invention are also achieved by providing a positioning method that includes the steps of linking a fluid actuator to a load, wherein the actuator includes a piston disposed in a cylinder to define first and second chambers; providing a first fluid valve having a first valve position venting the first chamber and a second valve position connecting the first chamber to the pressurized fluid source; providing a second fluid valve having a first valve position connecting the second chamber to the pressurized fluid source and a second valve position venting the second chamber; and alternatively shifting the first and second fluid valves concurrently to their first valve positions for a first time period and concurrently to their second valve positions for a second time period. The method further includes the steps of equalizing the first and second time periods to balance hydraulic fluid pressures in the first and second chambers, such as to hold the load in a desired position; increasing the first time periods relative to the second time periods to unbalance the hydraulic fluid pressures in the first and second chambers, thereby to move the load in a first direction; and decreasing the first time periods relative to the second time periods to unbalance the hydraulic fluid pressures in the first and second chambers, such as to move the load in a second direction.

Additional features, advantages, and objectives of the invention will be set forth in the description which follows and in part will be apparent from the description, or may be learned by practice of the invention. The objectives and advantages of the present invention will be realized and attained by the apparatus and method particularly pointed out in the following written description and the appended claims, as well as in the accompanying drawing.

It will be understood that both the foregoing general description and the following detailed description are exemplary and explanatory and are intended to provide further explanation of the invention as claimed.

The accompanying drawing is intended to provide a further understanding of the invention and is incorporated in and constitutes a part of the specification, illustrates a preferred embodiment of the invention, and, together with the description, serves to explain the principles of the invention.

BRIEF DESCRIPTION OF THE DRAWINGS

The sole FIGURE of the drawing is a schematic diagram of a positioning apparatus structured in accordance with a preferred embodiment of the present invention.

DETAILED DESCRIPTION OF THE PREFERRED EMBODIMENT

The positioning apparatus of the present invention, generally indicated at 10, comprises a fluid actuator 12, a pair of three-way solenoid valves 14 and 16 for connecting fluid chambers of the actuator to either a common source 18 of pressurized fluid or to connect the chambers to atmosphere 20, and an electronic module 22 connected to controllably energize the solenoid valves in response to position command signals, such as to selectively position a load 24 linked to fluid actuator 12. Source 18 may consist of compressed air or pressurized hydraulic fluid such as produced at the pressure regulated output of a sump pump. If hydraulic fluid is utilized as the power source, fluid valves would vent the actuator chambers to a sump.

Actuator 12 includes a cylinder 26 in which a piston 28 is slidingly received to define a pair of opposed chambers 30 and 32. Piston 28 is mounted for reciprocating motion within cylinder 26 by opposed piston rods extending through hermetically sealed openings in the cylinder endwalls. The exterior end of one piston rod is linked, as schematically indicated at 36 to load 24. The position of piston 28 may be fixed, in which case cylinder 26 is mechanically linked to the load.

Three-way solenoid valve 14 includes a pair of valve positions 38 and 40 established by a valve spool (not shown) that is connected by a stem 42 to a plunger 44. A spring 46 acts on the plunger to bias the valve spool in the direction of arrow 47 to a position that establishes valve position 38 as the quiescent valve position of solenoid valve 14. Three-way solenoid valve 16 is preferably identical to solenoid valve 14, and thus includes a pair of valve positions 48 and 50 established by a valve spool (not shown) that is connected to a plunger 52 by a stem 54. A spring 56 acts on the plunger 52 to bias the valve spool in the direction of arrow 57 to a position that establishes valve position 50 as the quiescent valve position of solenoid valve 16.

A port 58, opening into actuator chamber 30, is connected by a fluid line 60 to a port 62 of solenoid valve 14, while a port 64, opening into actuator chamber 32, is connected by a fluid line 66 to a port 68 by a valve 16. Port 70 of solenoid valve 14 and port 72 of solenoid valve 16 are connected in parallel by fluid lines 76 and 78 to the pressurized fluid source 18. Completing the fluidic circuit of apparatus 10, port 80 of solenoid valve 14 and port 82 of solenoid valve 16 are connected in parallel to atmosphere 20 by fluid lines 84 and 86

A solenoid coil 88, surrounding plunger 44 of solenoid valve 14, is grounded at one end and connected at its other end to an electronic module 22 by a lead 90. A solenoid coil 92, surrounding plunger 52 of solenoid valve 16, is grounded at one end and connected at its other end to electronic module 22 in parallel with solenoid coil 88 by a lead 94. The electronic module is structured in a known manner to pulse width modulate (PWM), in response to position command signals received over lead 96, a stream 98 of current pulses that are applied in parallel to the solenoid coil 88 of solenoid valve 14 and to the solenoid coil 92 of solenoid valve 16. The pulse rate of stream 98 may be sixteen pulses per second, for example. Finally, orifices 100, located in fluid lines 76, 78, 84, and 86, adjust the rates of fluid flow through these lines and thus balance system variables and prevent abrupt fluid pressure changes in the actuator chambers 30 and 32.

As can be seen in the drawing, when solenoid valves 14 and 16 assume their respective quiescent positions 38 and 50 during the intervals between current pulses of stream 98, actuator chamber 30 is vented and actuator chamber 32 is in fluid communication with the pressurized fluid source 18. Under these conditions, the hydraulic fluid pressure in actuator chamber 32 exceeds the hydraulic fluid pressure in actuator chamber 30. The volume of chamber 32 expands, as the volume of chamber 30 contracts, and piston 28 is propelled leftward, as is load 24.

On the other hand, during the interval (width) of each pulse of pulse stream 98, solenoid valves 14 and 16 assume their actuated positions 40 and 48, respectively, such that actuator chamber 30 is placed in fluid communication with the pressurized fluid source 18, and actuator chamber 32 is vented. The fluid pressure in actuator chamber 30 then exceeds the fluid pressure in actuator chamber 32. The volume of actuator chamber 30 then expands, as the volume of actuator chamber 32 contracts, and piston 28 is propelled rightward, as is load 24

When the pulse duty cycle set by a command signal on line 96 is 50% (pulse width equals pulse interval), it is seen that the mean effective pressures in the actuator chambers 30 and 32 are equalized, i.e., balanced, and piston 28 remains essentially stationary to hold load 24 in a desired position. The slight dithering of the piston due to the alternating pressurizing and venting of the actuator chambers at the pulse rate of the stream 98 advantageously eliminates adverse affects of static friction and hysteresis in the operation of the apparatus 10.

When the pulse duty cycle is reduced below 50%, the mean effective fluid pressure in actuator chamber 32 exceeds the mean effective pressure in actuator chamber 30, and the load 24 is moved leftward. It will be appreciated that the rate at which the load is moved to the left increases proportionately to the reduction in the pulse duty cycle below 50%. Thus, the load is moved leftward at a maximum rate when the pulse stream is interrupted. This feature can be used to advantage in certain applications to move the load at a maximum rate to a failsafe position in the event of a catastrophic electronic control failure. When leftward movement brings load 24 to the desired new position, the command signal returns the pulse duty cycle to 50%, thereby holding the load in the new position.

Conversely, when the pulse duty cycle is increased above 50%, the mean effective fluid pressure in actuator 30 exceeds the mean effective fluid pressure in actuator chamber 32, and the load is moved rightward at a rate proportional to the difference between the increased duty cycle and a 50% duty cycle. The maximum rate of rightward movement is achieved at a 100% duty cycle, i.e., DC energization of solenoid coils 88 and 92. When the load achieves the desired new rightward position, the pulse duty cycle is returned to 50% to hold the load in this new position.

It will be appreciated that the present invention has numerous applications, since load 24 may be any member that must be translated through a range of positions at appropriate rates to control the operation of a piece of equipment. For example, the apparatus of the present invention may be utilized as a ratio controller in a continuously variable hydrostatic transmission, such as disclosed in my U.S. application Ser. No. 08/380,269, filed Jan. 30, 1995; the disclosure of which is incorporated herein by reference.

It will be appreciated by those skilled in the art that various modifications and variations can be made to the apparatus and method of the present invention without departing from the spirit of the invention. Thus, it is intended that the present invention be construed to cover modifications and variations thereof, provided they come within the spirit and scope of the appended claims and their equivalents.

What is claimed is:

1. A positioning apparatus comprising:

a fluid actuator including a cylinder and a piston disposed in the cylinder to define first and second chambers;

a first fluid valve having a quiescent valve position connecting the first chamber to a source of fluid pressure and an actuated valve position venting the first chamber;

a second fluid valve having a quiescent valve position venting the second chamber and an actuated valve position connecting the second chamber to the source of fluid pressure;

a module, connected to the first and second fluid valves and responsive to input commands, for periodically and simultaneously activating the first and second fluid valves to their respective actuated valve positions for time periods effective to create differential fluid pressures in the first and second chambers, thereby producing relative motion of the piston and the cylinder; and means for translating the relative motion into positioning movements of a load.

2. The positioning apparatus defined in claim 1, wherein the module activates the first and second fluid valves in parallel with a stream of electrical pulses to shift the fluid valves to their respective actuated valve positions for the duration of each pulse, the first and second fluid valves being biased to their respective quiescent valve positions by respective resilient elements during the duration of each interval between pulses.

3. The positioning apparatus defined in claim 2, wherein the module modulates a pulse width of the pulse stream to control a rate and a direction of the load positioning movements.

4. The positioning apparatus defined in claim 3, wherein the first and second fluid valves are solenoid valves, and the pulse stream is a current pulse stream.

5. The positioning apparatus defined in claim 4, wherein the translating means includes a linkage connecting the piston to the load.

6. The positioning apparatus defined in claim 2, further comprising fluid flow restrictors included in fluid lines connecting the first and second chambers to the fluid pressure source and in fluid lines venting the first and second chambers.

7. A method for positioning a load comprising the steps of:

linking a fluid actuator to the load, the actuator including a piston disposed in a cylinder to define first and second chambers;

providing a source of pressured fluid;

providing a first fluid valve having a first valve position venting the first chamber and a second valve position connecting the first chamber to the pressurized fluid source;

providing a second fluid valve having a first valve position connecting the second chamber to the pressurized fluid source and a second valve position venting the second chamber;

periodically shifting the first and second fluid valves concurrently to their first valve positions for a succession of first time periods and concurrently to their second valve positions for a succession of second time periods, the first and second time periods occurring in alternation;

equalizing the first and second time periods to balance fluid pressures in the first and second chambers, whereby to hold the load in a desired position;

increasing the first time periods relative to the second time periods to unbalance the fluid pressures in the first and second chambers, whereby to move the load in a first direction; and decreasing the first time periods relative to the second time periods to unbalance the fluid pressures in the first and second chambers, whereby to move the load in a second direction.

8. The method defined in claim 7, wherein the first and second valves are first and second solenoid valves normally biased to their second valve positions, and wherein the shifting step is executed by the first and second solenoid valves in parallel using a stream of pulses to concurrently shift the first and second solenoid valves to their respective first positions for the interval of each pulse, the first and second solenoid valves concurrently returning to their second valve position during each interval between pulses, the pulse durations determining the first time periods and the pulse intervals determining the second time periods.

9. The method defined in claim 8, wherein the equalizing, increasing, and decreasing steps are executed by selectively pulse width modulating the pulse stream.

* * * * *